United States Patent Office 3,166,746
Patented Jan. 19, 1965

3,166,746
TARGET VELOCITY-AZIMUTH INDICATOR
Robert S. Jacobson, Northport, N.Y., assignor to Sperry Rand Corporation, Great Neck, N.Y., a corporation of Delaware
Filed Sept. 23, 1960, Ser. No. 58,142
7 Claims. (Cl. 343—9)

The present invention generally relates to radar target data indicators and, more particularly, to a pulse Doppler radar indicator for the display of target data in terms of velocity and azimuth coordinates.

Pulse Doppler radar systems are well known for their ability to unambiguously determine target velocity and to discriminate between targets moving at nearly the same velocity. With the aid of conventional antenna techniques, a high degree of azimuth discrimination between targets can also be achieved. Unambiguous target range information, on the other hand, is not readily available in pulse Doppler radar systems particularly because of the very high pulse repetition rates which are employed. As is well understood, it is necessary to utilize pulse repetition rates which are substantially higher than the maximum anticipated Doppler signal return in order to avoid so-called "blind" target velocities. Such velocities are those which produce a Doppler signal having a frequency equal to the radar pulse repetition rate or multiples thereof in which case no target velocity data can be determined.

The relative abilities and shortcomings inherent in pulse Doppler radar systems of course must be taken into account in the design of a useful target data presentation unit. Accordingly, designers of pulse Doppler radars generally avoid attempts to present range information and concentrate, instead, on the presentation of target velocity and target azimuth information. The problem remains, however, to produce a target velocity-azimuth indication which may be readily interpreted by an observer with respect to a multiplicity of targets.

It is the general object of the present invention to provide a radar indicator for the simultaneous display of velocity data respecting a multiplicity of targets.

An additional object is to provide a radar indicator for the simultaneous display of velocity and azimuth data respecting a multiplicity of targets.

Another object is to provide a target velocity-azimuth indicator suitable for use in a pulse Doppler radar system.

A further object is to provide an off-center cathode ray tube indication for the display of target velocity and azimuth data in a pulse Doppler radar system.

These and other objects of the present invention, as will appear from a reading of the following specification, are accomplished in a preferred embodiment by the provision of a pulse Doppler transmitter and receiver of the coherent type. The radar antenna is adapted for scanning in azimuth through a predetermined angular extent. The coherently detected target video signals are jointly applied to a plurality of bandpass filters, each filter having substantially the same bandpass frequency extent and being tuned to a different but neighboring frequency within the spectrum of anticipated Doppler echo signals.

The signals at the output of each filter which exceed a predetermined threshold are detected and applied to a respective signal storage unit. Means are provided for successively scanning the storage units so as to "read out" the information stored therein in a predetermined sequence synchronized with the generation of a cathode ray tube indicator sweep. The cathode ray tube beam is intensity modulated by the signals which are "read out" from the storage units. The cathode ray tube beam is radially deflected by the same sweep signal with which the "reading out" of the storage units is synchronized while the beam is angularly deflected synchronously with the movement of the scanning antenna. The resulting indicator display is similar to the well known off-center PPI except that the radial dimension represents target velocity rather than target range.

For a more complete understanding of the present invention, reference should be had to the following specification and to the appended figures of which:

Figure 1:
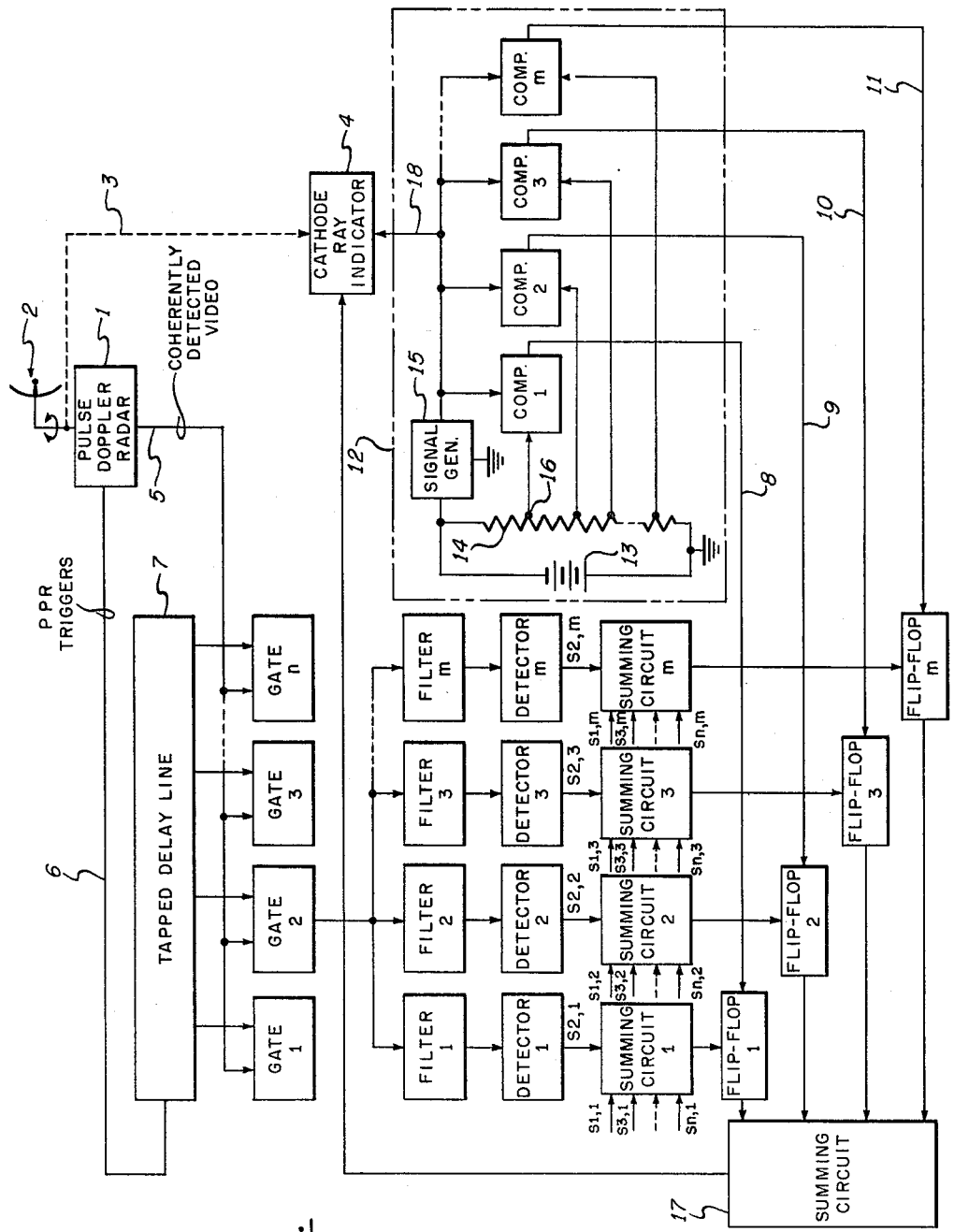
FIG. 1 is a simplified block diagram of a preferred embodiment.

In FIG. 1, the numeral 1 generally designates a conventional pulse Doppler radar transmitter and receiver of the coherent type. Such radars are described in Chapter 16 of Radar System Engineering, Radiation Laboratory Series, volume 1, McGraw-Hill, 1947. Radar 1 employs a directional antenna 2 which is repeatedly scanned in azimuth over predetermined angular sector by conventional means (not shown). The azimuthally scanning movement of antenna 2 is coupled via linkage 3 to the angular deflection means of cathode ray tube indicator 4.

Two output signals are derived from radar 1. Coherently detected target video signals are produced on line 5. Pulse repetition rate trigger signals are extracted via line 6. The trigger signals of line 6 are applied to the input of tapped delay line 7 having a plurality of outputs at substantially equal fractional intervals of the pulse repetition period of radar 1. Each tap is connected to a respective one of gates 1, 2, 3 . . . n. The detected video signal output on line 5 is jointly applied to each of the gating circuits 1, 2, 3 . . . n. Each gate is a conventional electronic pulse coincidence circuit which passes a detected video pulse if it occurs simultaneously with a delayed pulse derived from line 7. It will be understood that the output of each of gates 1, 2, 3 . . . n is applied to a respective plurality of filters 1, 2, 3 . . . m. For the sake of simplicity and clarity, however, only gate 2 is shown in FIG. 1 as being connected to its plurality of filters.

Each of filter 1, 2, 3 . . . m is of the bandpass type, has substantially the same bandpass extent and is tuned to a different but neighboring frequency within the spectrum of Doppler frequencies to which the apparatus of FIG. 1 is to respond. Each filter output is connected to a respective one of detectors 1, 2, 3 . . . m which detects and passes those signals at the output of its respectively associated filter exceeding a predetermined amplitude threshold. The amplitude threshold is determined in accordance with conventional criteria, based upon the maximum "false triggering" (due to noise) which is to be tolerated. It will now be seen that the function of each of the gates 1, 2, 3 . . . n is to improve the signal-to-noise ratio at the input to the filters connected thereto. Only the noise occurring during the time that one of the gates is actuated reaches the respectively associated filters.

The output of each of detectors 1, 2, 3 . . . m is applied to a first input of a respective one of summing circuits 1, 2, 3 . . . m. For purposes of explanation, the output signals of detectors 1, 2, 3 . . . m are respectively designated $S_{2,1}$; $S_{2,2}$; $S_{2,3}$ . . . $S_{2,m}$. The first subscript of the symbol S designates the number of the particular gating circuit to which it is coupled; the second subscript represents the number of the particular bandpass filter to which it is coupled.

As previously mentioned, each of the gating circuits other than gate 2 also is coupled to a respective plurality of filter channels 1, 2, 3 . . . m. Each filter channel, in turn, may produce a detected output signal S. The additional detected output signals S are also applied to summing circuits 1, 2, 3 . . . m in accordance with the frequency of the respective channel. For example, there is coupled to summing circuit 1 in addition to detected output signal $S_{2,1}$ the plurality of signals designated $S_{1,1}$; $S_{3,1}$ . . . $S_{n,1}$. Signal $S_{1,1}$ represents the output signal from the filter channel (not shown) passing the same frequencies as filter 1 but which is coupled to the output of gate 1. Similarly, signal $S_{3,1}$ is derived from the filter channel (not shown) passing the same band of frequencies as filter 1 but which is connected to gate 3. The signals which are applied to the remaining summing circuits 2, 3 . . . m are identified by the symbol S and the respective subscripts in a similar manner. Thus, summing circuit 1, for example, produces an output signal in the presence of a Doppler signal having a frequency within the bandpass of filter 1 irrespective of the particular one of gates 1, 2, 3 . . . n through which said Doppler signal passed. The output of each of summing circuits 1, 2, 3 . . . m is coupled to a first input of a respective one of flip-flops 1, 2, 3 . . . m. Each of said flip-flops is placed in a predetermined state upon the occurrence of an output signal from a respectively associated summing circuit. In this manner, each flip-flop serves as a memory unit until it is reset or "read out" by a pulse appearing on a respective one of lines 8, 9, 10 and 11.

The "reading out" of the data stored in each of flip-flops 1, 2, 3 . . . m is determined by the action of programming circuit 12. Programming circuit 12 comprises a source of potential 13 and a tapped resistor 14 coupled across the terminals of source 13. Source 13 also energizes sweep generator 15 which produces a recurrent series of linear sawtooth signals in a conventional manner. Each of the taps of resistor 14 produces a potential which is a predetermined fraction of the total potential of source 13. Assuming, for example, that generator 15 produces a negative sawtooth of appropriate amplitude and having a positive slope, it will be seen that the instantaneous amplitude of said sawtooth will equal the potentials at the taps of resistor 14 in a predetermined time sequence. Conventional voltage comparators 1, 2, 3 . . . m are provided to produce pulses upon the occasions of such equality.

The sawtooth signal produced by generator 15 is jointly applied to each of the comparators. Additionally, each comparator is coupled to a respective one of the taps along resistor 14. Comparator 1, for example, produces an output pulse on line 8 upon the equality in amplitude between the amplitude of the sawtooth and the potential of tap 16. In the arrangement described, the pulses generated by the comparator circuits will successively occur in the time sequence 1, 2, 3 . . . m following the initiation of each sawtooth produced by generator 15. In operation, "read out" pulses are applied to lines 8, 9, 10 and 11 to actuate their respective flip-flop storage units in the sequence 1, 2, 3 . . . m. If a "read out" pulse is applied to a flip-flop which was previously placed into a predetermined condition by the output of a respective summing circuit, said "read out" pulse will reset the flip-flop to its other predetermined condition thereby producing an output pulse. If a flip-flop had not previously received an output signal from a respective summing circuit, then the "read out" pulse derived from programming circuit 12 will have no effect.

The pulses produced at the output of flip-flops 1, 2, 3 . . . m are jointly applied to summing circuit 17, the output of which is applied to the intensity modulation electrode of cathode ray tube indicator 4. The radial sweep of the electron beam of indicator 4 is deflected by the sawtooth signal of line 18 at the output of generator 15.

Figure 2:
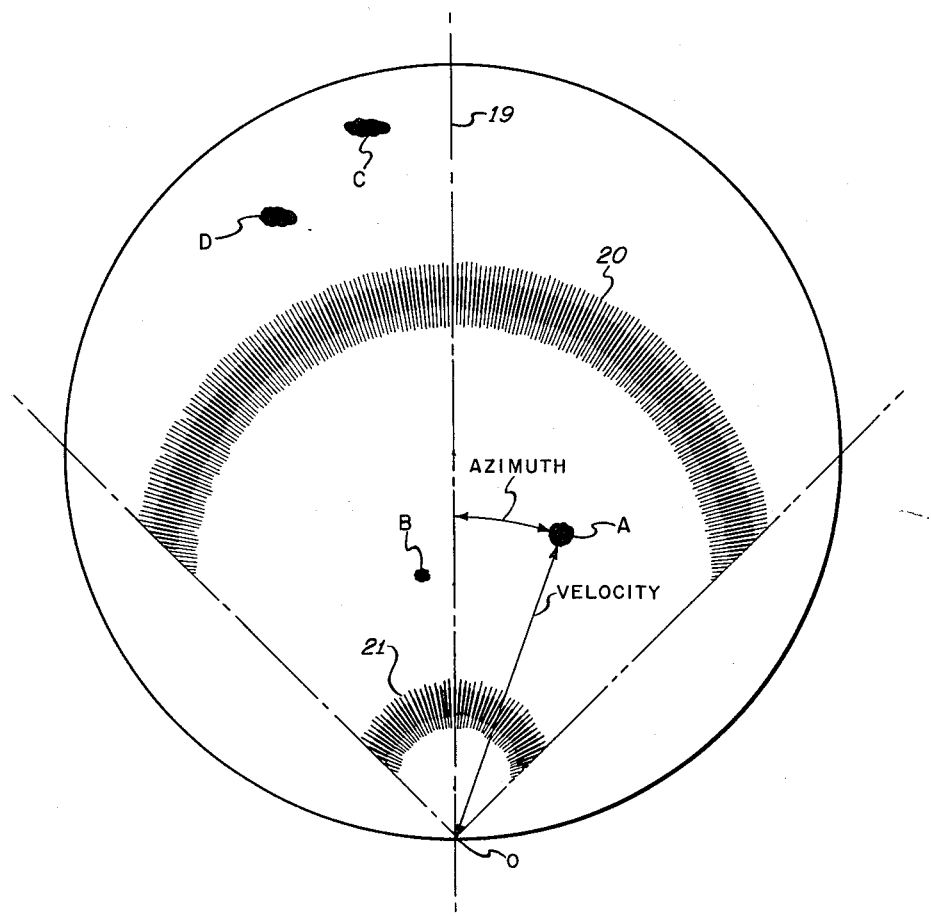
FIG. 2 is a typical view of a target data display generated by the apparatus of FIG. 1.

A typical target data display produced by the apparatus of FIG. 1 is represented in FIG. 2. In the typical presentation shown, the undeflected origin O of the electron beam trace has been "off-centered" in a conventional manner, i.e., the origin has been moved adjacent the periphery of the tube. This has been done so as to better utilize the available area on the tube face for the display of the polar coordinate data respecting target velocity and target azimuth in the case where the radar antenna is scanned through a limited azimuth sector. Four targets are represented by the respective indications A, B, C, D. The relative bearing or azimuth of target A is measured by the indicated angle whereas the velocity of target A relative to the velocity of the situs of the Doppler radar (which itself may be airborne) is represented by the radial distance between the target indication and the sweep origin. In a representative case, radar antenna 2 is scanned approximately ±30° about a predetermined direction represented by the dashed line 19. Line 19 might represent, for example, the longitudinal axis of the reference aircraft carrying the pulse Doppler radar system.

Indications B and C represent two other aircraft having the same relative bearing from the reference aircraft but moving at different velocities with respect to the reference aircraft. The azimuths and relative velocities of the indicated targets are immediately determinable from the presentation, the order of relative velocity magnitudes (from highest to lowest) being C, D, A, B.

It will be seen that additional and useful velocity data may be derived from the presentation. Assuming that the Doppler radar system is airborne, the ground clutter or echo signals reflected from the terrain traversed by the reference aircraft will produce Doppler signals of finite frequency value which will be processed by the apparatus of FIG. 1 and displayed on the indication of FIG. 2. Two such ground clutter indications 20 and 21 are represented. It can be shown that Doppler signals reflected from the terrain substantially along the reference aircraft ground track will have a maximum frequency value whereas Doppler signals from the terrain substantially at right angles to the ground track will have a minimum frequency value. Thus, ground clutter return from the main beam of the azimuthally scanning radar will be displayed as the arcuate indication 20. Similarly, ground clutter returns resulting from a minor lobe of the scanning antenna (said minor lobe pointing in a direction opposite to the direction of the main beam) will be displayed as the arcuate indication 21. The main beam clutter return is characterized by having the greatest radial displacement from the origin of the undeflected cathode ray tube beam.

Ground clutter ring 20 serves as a reference for further distinguishing the targets represented by indications A, B, C, D. Targets C and D each have a greater radial displacement from the scope origin than does clutter ring 20. Therefore, targets C and D are approaching the reference aircraft at higher rates than the terrain and it generally can be concluded that targets C and D are moving toward the reference aircraft. On the other hand, one may generally conclude that targets A and B are moving away from the reference aircraft because each has a relative velocity less than the velocity of clutter ring 20 relative to the reference aircraft. Targets A and B might be aircraft being pursued by the reference aircraft whereas targets C and D might be aircraft flying toward the reference aircraft.

It should be noted that the presentation of FIG. 2 permits the simultaneous evaluation of the velocities and corresponding azimuth angles of a multiplicity of targets due to the inherent integrating effect of the long persistent phosphors on the face of the cathode ray tube. In addition to relative bearing information, there is also indicated the velocity of each target relative to the reference aircraft, a measure of the velocity of the terrain relative to the reference aircraft (radial displacement of ring 20), and a measure of the velocity of each target relative to the terrain (radial displacement of the target indication from ring 20) in a form which is readily interpretable.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. Apparatus comprising a radar for the detection of target echo signals, a plurality of bandpass filters, each filter being tuned to a different but neighboring frequency within the spectrum of anticipated Doppler echo signal frequencies, means for jointly applying the detected target echo signals to said plurality of bandpass filters, a plurality of signal storage units, each storage unit being coupled to the output of a respective one of said plurality of bandpass filters, a programming circuit for producing a plurality of successively occurring pulses during a predetermined time interval, each of said successively occurring pulses being applied to a respective one of said plurality of storage units, each storage unit producing an output pulse in the event that it first receives a signal from its respectively associated filter and then receives a respective one of said successively occurring pulses, a cathode ray tube indicator having an electron beam, means for intensity modulating said beam, means for jointly connecting the output of each of said plurality of storage units to said means for intensity modulating, and means coupled to said programming circuit for deflecting said beam during said predetermined time interval.

2. Apparatus comprising a radar for the detection of target echo signals, a plurality of bandpass filters, each filter having substantially the same bandpass frequency extent and being tuned to a different but neighboring frequency within the spectrum of anticipated Doppler echo signal frequencies, means for jointly applying the detected target echo signals to said plurality of bandpass filters, a plurality of signal storage units, each storage unit being coupled to the output of a respective one of said plurality of bandpass filters, a programming circuit including a source of repetitive sweep signals, said circuit producing a plurality of successively occurring pulses during each sweep signal, each of said successively occurring pulses being applied to a respective one of said plurality of storage units, each storage unit producing an output pulse in the event that it first receives a signal from its respectively associated filter and then receives a respective one of said successively occurring pulses, a cathode ray tube indicator having an electron beam, means for intensity modulating said beam, means for jointly connecting the output of each of said plurality of storage units to said means for intensity modulating, and means for deflecting said beam, said sweep signals being applied to said last-named means.

3. Apparatus comprising a radar for the coherent detection of target echo signals, a plurality of bandpass filters, each filter having substantially the same bandpass frequency extent and being tuned to a different but neighboring frequency within the spectrum of anticipated Doppler echo signal frequencies, means for jointly applying the coherently detected target echo signals to said plurality of bandpass filters, a plurality of signal storage units, each storage unit being coupled to the output of a respective one of said plurality of bandpass filters, a programming circuit including a source of repetitive sweep signals, said circuit producing a plurality of successively occurring pulses during each sweep signal, each of said successively occurring pulses being applied to a respective one of said plurality of storage units, each storage unit producing an output pulse in the event that it first receives a signal from its respectively associated filter and then receives a respective one of said successively occurring pulses, a signal summing circuit connected to the output of each of said plurality of storage units, a cathode ray tube indicator having an electron beam, means for intensity modulating said beam, the output of said summing circuit being connected to said means for intensity modulating, and means for deflecting said beam, said sweep signals being applied to said last-named means.

4. Apparatus comprising a radar for the coherent detection of target echo signals, said radar having a directional antenna scannable through an angular sector, a plurality of bandpass filters, each filter having substantially the same bandpass frequency extent and being tuned to a different but neighboring frequency within the spectrum of anticipated Doppler echo signal frequencies, means for jointly applying the coherently detected target echo signals to said plurality of bandpass filters, a plurality of signal storage units, each storage unit being coupled to the output of a respective one of said plurality of bandpass filters, a programming circuit including a source of repetitive sweep signals, said circuit producing a plurality of successively occurring pulses during each sweep signal, each of said successively occurring pulses being applied to a respective one of said plurality of storage units, each storage unit producing an output pulse in the event that it first receives a signal from its respectively associated filter and then receives a respective one of said successively occurring pulses, a cathode ray tube indicator having an electron beam, means for intensity modulating said beam, means for jointly connecting the output of each of said plurality of storage units to said means for intensity modulating, means for radially deflecting said beam, said sweep signals being applied to said means for radially deflecting, and means for angularly deflecting said beam, said last-named means being coupled to said directional antenna and responsive to the angular position thereof.

5. Apparatus comprising a radar for the coherent detection of target echo signals, said radar having a predetermined pulse repetition period, a plurality of bandpass filters, each filter being tuned to a different but neighboring frequency within the spectrum of anticipated Doppler echo signal frequencies, gating means for jointly applying when actuated the coherently detected target echo signals to said plurality of bandpass filters, means coupled to said radar for actuating said gating means during a fractional interval of said predetermined pulse repetition period, a plurality of signal storage units, each storage unit being coupled to the output of a respective one of said plurality of bandpass filters, a programming circuit for producing a plurality of successively occurring pulses during a predetermined time interval, each of said successively occurring pulses being applied to a respective one of said plurality of storage units, each storage unit producing an output pulse in the event that it first receives a signal from its respectively associated filter and then receives a respective one of said successively occurring pulses, a cathode ray tube indicator having an electron beam, means for intensity modulating said beam, means for jointly connecting the output of each of said plurality of storage units to said means for intensity modulating, and means connected to said programming circuit for deflecting said beam during said predetermined interval.

6. Apparatus comprising a radar for the coherent detection of target echo signals, said radar having a predetermined pulse repetition period, a plurality of bandpass filters, each filter having substantially the same bandpass frequency extent and being tuned to a different but neighboring frequency within the spectrum of anticipated Doppler echo signal frequencies, gating means for jointly applying when actuated the coherently detected target echo signals to said plurality of bandpass filters, means coupled to said radar for actuating said gating means during a fractional interval of said predetermined pulse repetition period, a plurality of signal storage units, each storage unit being coupled to the output of a respective one of said plurality of bandpass filters, a programming circuit including a source of repetitive sweep signals, said circuit producing a plurality of successively occurring pulses during each sweep signal, each of said successively occurring pulses being applied to a respective one of said plurality of storage units, each storage unit producing an output pulse in the event that it first receives a signal from its respectively associated filter and then receives a respective one of said successively occurring pulses, a cathode ray tube indicator having an electron beam, means for intensity modulating said beam, means for jointly connecting the output of each of said plurality of storage units to said means for intensity modulating, and means for radially deflecting said beam, said sweep signals being applied to said last-named means.

7. Apparatus comprising a radar for the coherent detection of target echo signals, said radar having a predetermined pulse repetition period and having a directional antenna scannable through an angular sector, a plurality of bandpass filters, each filter having substantially the same bandpass frequency extent and being tuned to a different but neighboring frequency within the spectrum of anticipated Doppler echo signal frequencies, gating means for jointly applying when actuated the coherently detected target echo signals to said plurality of bandpass filters, means coupled to said radar for actuating said gating means during a fractional interval of said predetermined pulse repetition period, a plurality of signal storage units, each storage unit being coupled to the output of a respective one of said plurality of bandpass filters, a programming circuit including a source of repetitive sweep signals, said circuit producing a plurality of successively occurring pulses during each sweep signal, each of said successively occurring pulses being applied to a respective one of said plurality of storage units, each storage unit producing an output pulse in the event that it first receives a signal from its respectively associated filter and then receives a respective one of said successively occurring pulses, a signal summing circuit connected to the output of each of said plurality of storage units, a cathode ray tube indicator having an electron beam, means for intensity modulating said beam, the output of said summing circuit being connected to said means for intensity modulating, means for radially deflecting said beam, said sweep signals being applied to said means for radially deflecting, and means for angularly deflecting said beam, said last-named means being coupled to said directional antenna and responsive to the angular position thereof.

No references cited.